United States Patent [19]

Kaji et al.

[11] Patent Number: 5,625,718

[45] Date of Patent: Apr. 29, 1997

[54] WHITE LEVEL SETTING SYSTEM FOR AN IMAGE SCANNER

[75] Inventors: Yukio Kaji, Kanazawa; Toshiki Nakajima, Hakui-gun, both of Japan

[73] Assignees: PFU Limited, Ishikawa; Fujitsu Limited, Kawasaki, both of Japan

[21] Appl. No.: 462,743

[22] Filed: Jun. 5, 1995

Related U.S. Application Data

[63] Continuation of Ser. No. 133,147, filed as PCT/JP93/00236, Feb. 25, 1993, abandoned.

[30] Foreign Application Priority Data

Feb. 25, 1992 [JP] Japan ..................................... 4-037835
May 13, 1992 [JP] Japan ..................................... 4-120826

[51] Int. Cl.$^6$ ........................................................ G06K 9/36
[52] U.S. Cl. ............................ 382/274; 382/319; 358/406
[58] Field of Search ............................ 358/446, 455, 358/461, 406; 382/312, 318, 319, 274

[56] References Cited

U.S. PATENT DOCUMENTS

| | | | |
|---|---|---|---|
| 4,709,274 | 11/1987 | Tanioka | 382/272 |
| 5,065,257 | 11/1991 | Yamada | 358/463 |
| 5,151,796 | 9/1992 | Ito et al. | 358/461 |
| 5,237,172 | 8/1993 | Lehman et al. | 358/496 |
| 5,267,053 | 11/1993 | Potucek et al. | 358/446 |
| 5,331,428 | 7/1994 | Uffel | 358/446 |

FOREIGN PATENT DOCUMENTS

| | | |
|---|---|---|
| 0070161 | 1/1983 | European Pat. Off. . |
| 3726696A1 | 2/1988 | Germany . |
| 63-59272 | 3/1988 | Japan . |
| 1-146464 | 6/1989 | Japan . |
| 2-218270 | 8/1990 | Japan . |
| WO90/04900 | 5/1990 | WIPO . |

*Primary Examiner*—Joseph Mancuso
*Assistant Examiner*—Jon Chang
*Attorney, Agent, or Firm*—Nikaido, Marmelstein, Murray & Oram LLP

[57] ABSTRACT

The present invention provides a white level setting system for an image scanner. The system compares an analog image signal obtained by scanning an original or a white reference with a predetermined analog white level signal, to provide a digital image signal corresponding to an image on the original, calculates a white level for the next scan line according to the digital image signal, and employs the white level for the next scan line.

1 Claim, 12 Drawing Sheets

WHITE LEVEL SETTING SYSTEM FOR AN IMAGE SCANNER

This application is a continuation of application Ser. No. 08/133,147, filed as PCT/JP93/00236 Feb. 25, 1993, now abandoned.

TECHNICAL FIELD

The present invention relates to an image scanner for reading characters and images recorded on an original, and particularly, to a white level setting system for an image scanner, for setting a required white level with a delay of a scan line when detecting the gray level of an image recorded on an original, and to a binarization system for an image scanner, for discriminating between white and black parts in read data.

BACKGROUND ART

An image scanner raster-scans characters and images recorded on an original and converts the scanned data into electric signals to be read.

The image scanner successively traces the gray levels of the ground color of the original, prepares a required white level according to the gray levels, and generates an analog white level signal representing the white level. The image scanner scans the original, provides analog image signals representing the scanned original, determines the gray level (between 0 and 1) of each of the analog image signals according to the analog white level signal serving as a white level of 1, and provides digital image signals representing the gray levels. The gray levels represented with the digital image signals are examined to determine whether or not the original contains recorded images as well as the concentration of the images.

The characters and images recorded on the original and read by the image scanner may be read into a computer. In this case, the gray levels of pixels read by CCD sensors of the image scanner are compared with a predetermined slice level, to binarize the read data into white and black parts. For this binarization, it is important to optimize the slice level to be compared with gray levels.

DISCLOSURE OF THE INVENTION

A first object of the present invention is to provide a white level setting system for an image scanner, which accurately and quickly determines a white level according to a change in the gray level of the ground color of an original, to accurately read characters and images recorded on the original, helps reduce a ground color area at the leading end of the original, and relaxes limits on originals to be read.

A second object of the present invention is to provide a binarization system for an image scanner, which correctly reads characters and images recorded on an original even if the original involves a wide or narrow range of gray levels without causing unwanted black dots, is capable of reading characters having sizes out of a predetermined range, and provides binary data according to the read data.

To achieve the first object, a white level setting system according to the present invention for an image scanner for scanning and reading characters and images recorded on an original has:

an analog-to-digital converter for receiving a first analog image signal obtained by scanning a predetermined white reference, or a second analog image signal obtained by scanning the original, and an analog white level signal representing a presently required white level, and providing a digital image signal representing the gray level of the first or second analog image signal according to the analog white level signal serving as a white level of 1;

a level data memory for providing a digital white level signal representing a required white level in response to a new white level instructing digital signal;

a digital-to-analog converter for converting the digital white level signal representing the required white level provided by the level data memory into an analog white level signal representing the required white level; and a calculation circuit for receiving the digital image signal from the analog-to-digital converter and the digital white level signal from the level data memory, and if there is a difference between the white levels represented with these signals, carrying out a calculation to adjust the white levels represented by these signals in relation to each other, and providing the level data memory with a new white level instructing digital signal according to the calculation. This arrangement easily prepares a white level according to a change in the gray level of the ground color of the original.

When the digital image signal represents a white level of "v" and the digital white level signal represents a white level of "W", the calculation circuit carries out the following calculation to make the level data memory provide a digital white level signal representing a new white level of "W'":

$$W'=W \times (v-a)/(1-a)$$

$$a=A \times 1/[W \times (1-A)+A]$$

where A is a correction value. According to the result of the calculation, the calculation circuit provides a new white level instructing digital signal.

To achieve the second object, a binarization system according to the present invention for an image scanner for scanning and reading characters and images recorded on an original and comparing the gray levels of the read data with a predetermined slice level, to provide binary data has:

a divider for dividing the read data into unit blocks and providing the gray levels of the blocks;

a rate-of-change calculator for calculating rates of changes in the gray levels of each of the blocks;

an edge detector for detecting edges in the gray levels according to the rates of changes;

a slice level decision unit for determining a binarization slice level for the read image data of each of the blocks according to the gray levels provided by the divider and the edges detected by the edge detector; and a correction unit for correcting the slice level.

The binarization system achieves optimum binarization and enables the image scanner to correctly read an original without causing unwanted black dots even if the original involves a wide or narrow range of gray levels, as well as reading characters that are out of a predetermined size range.

If a given block of read image data involves a narrow range of gray levels, the binarization system employs a slice level for the preceding block as a slice level for the given block.

The slice level decision unit may determine a slice level for a given block according to the average of a maximum and minimum of gray levels provided by the edge detector for the given block.

The correction unit may correct the slice level provided by the slice level decision unit according to a slice level for a corresponding block in the preceding raster.

BEST MODE OF CARRYING OUT THE INVENTION

Before explaining a white level setting system according to an embodiment of the present invention, a white level setting system according to a prior art and the problems thereof will be explained with reference to FIG. 5.

The figure schematically shows essential parts of the conventional white level setting system. Numeral 1 is an analog-to-digital converter, 2 is a level data memory, 3 is a digital-to-analog converter, 4 is an analog comparator, and 5 is a look-up table made of, for example, a ROM.

The analog-to-digital converter 1 receives a first input signal, i.e., an analog image signal (a first analog image signal AIS 1) provided by scanning a white reference (not shown) or an analog image signal (a second analog image signal AIS 2) provided by scanning an original, and a second input signal, i.e., an analog white level signal AWS representing a presently required white level. According to the analog white level signal AWS representing a gray level of 1, the analog-to-digital converter 1 determines a gray level corresponding to the first or second analog image signal, and according to the determined gray level, generates a digital image signal DIS for a scanned pixel.

The level data memory 2 receives a new white level instructing digital signal NDW. The digital-to-analog converter 3 converts a digital white level signal DWS into the analog white level signal AWS.

The analog comparator 4 compares the analog image signal AIS 1 or AIS 2 with the analog white level signal AWS and provides a level difference signal LD according to a difference between the levels of the signals AIS 1 or AIS 2 and AWS.

The look-up table 5 prepares the new digital white level signal NDW according to the digital white level signal DWS and level difference signal LD. For example, the look-up table 5 adds a white level represented by the digital white level signal DWS to a level difference represented by the level difference signal LD and generates the new white level instructing digital signal NDW, which is supplied to the level data memory 2.

Figure 5:
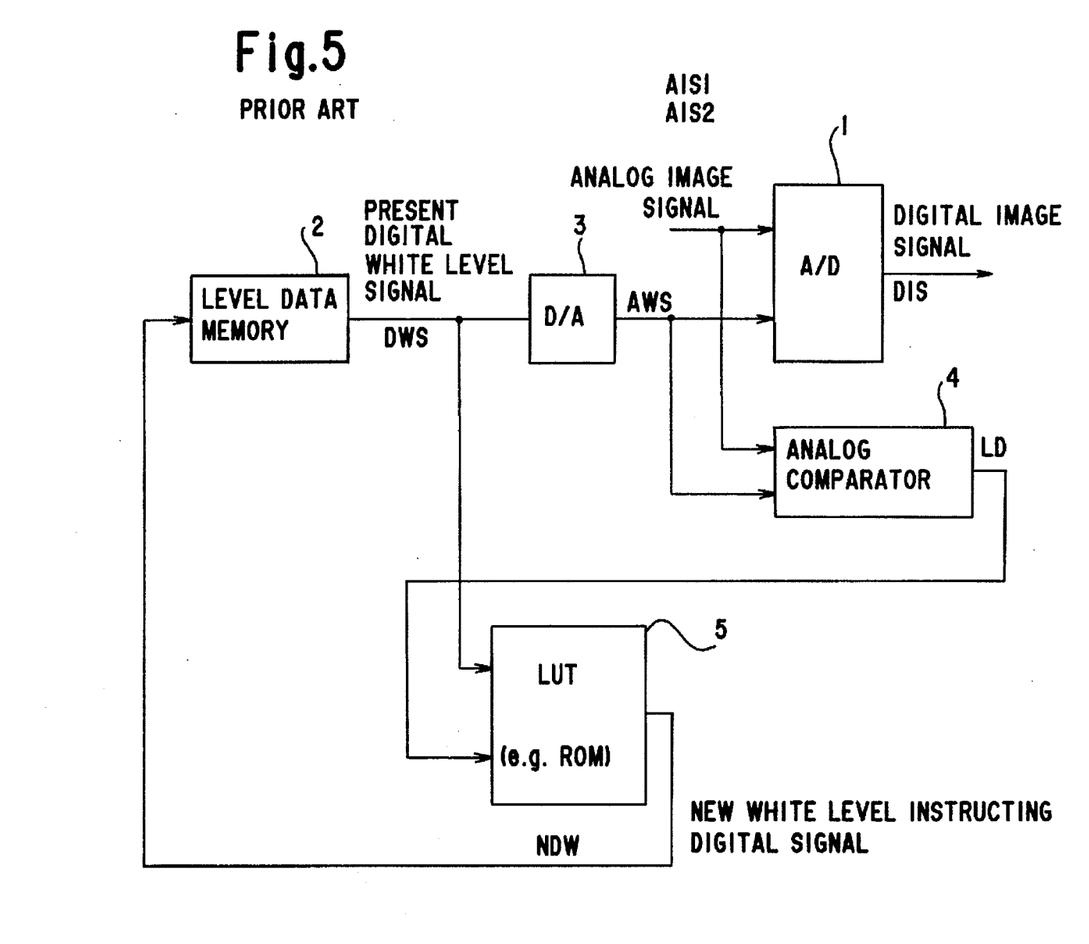
FIG. 5 is a schematic view showing essential parts of a white level setting system according to a prior art.

According to the prior art of FIG. 5, the analog comparator 4 provides the level difference signal LD at the start of reading (at the leading edge of an original), or when the ground color of the original is changed. This prior art involves a delay of several scan lines until providing the analog white level signal AWS representing a white level that correctly corresponds to the ground color of the original.

When the analog white level signal AWS correctly represents the gray level of the ground color of the original, the level difference signal LD is zero. If the ground color is changed, the new white level instructing digital signal NDW is supplied to the level data memory 2 in response to the change in the ground color. In spite of this, the digital white level signal DWS from the level data memory 2 does not follow the changed gray level of the ground color at once. Only after several scan lines, does the digital white level signal DWS come to represent the required gray level of the ground color.

The white level setting system according to the present invention follows a change in the gray level of a ground color only with a delay of a single scan line.

Figure 1:
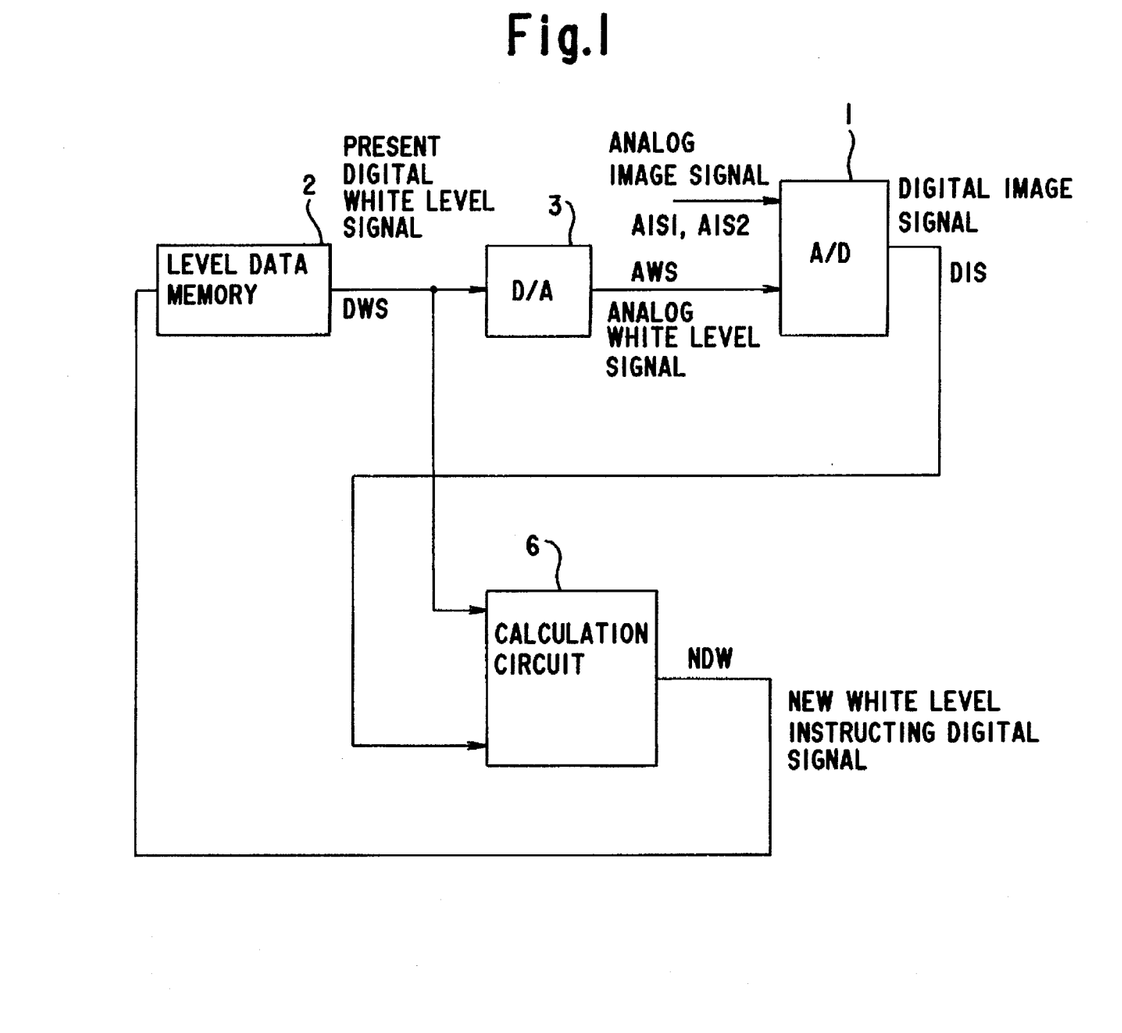
FIG. 1 is a schematic view showing essential parts of a white level setting system according to the present invention.

FIG. 1 shows a principle of the present invention. In the figure, numeral 1 is an analog-to-digital converter. According to an analog white level signal AWS representing a white level of 1, the converter 1 converts an analog image signal AIS 1 or AIS 2 into a gray level for a corresponding pixel in a scanned line.

Numeral 2 is a level data memory for generating a required digital white level signal DWS in response to a new white level instructing digital signal NDW. Numeral 3 is a digital-to-analog converter for converting the digital white level signal DWS into the analog white level signal AWS.

Numeral 6 is a calculation circuit according to the present invention. According to a white level represented by the digital white level signal DWS and a gray level represented by a digital image signal DIS (prepared from a signal obtained by scanning a white reference, or from a signal obtained by scanning the ground color of an original), the calculation circuit 6 generates the new white level instructing digital signal NDW to make the level data memory 2 provide for the next scan line an analog white level signal representing a required white level.

When the ground color of the original is unchanged, the calculation circuit 6 causes the level data memory 2 to continuously provide the present digital white level signal DWS.

When the ground color of the original is changed, the analog white level signal AWS provides the next scan line with a white level corresponding to the changed ground color of the original. Namely, the calculation circuit 6 calculates a white level corresponding to the ground color of the original and generates the new white level instructing digital signal NDW so that the digital white level signal DWS may represent, for the next scan line, the correct white level.

Figure 2:
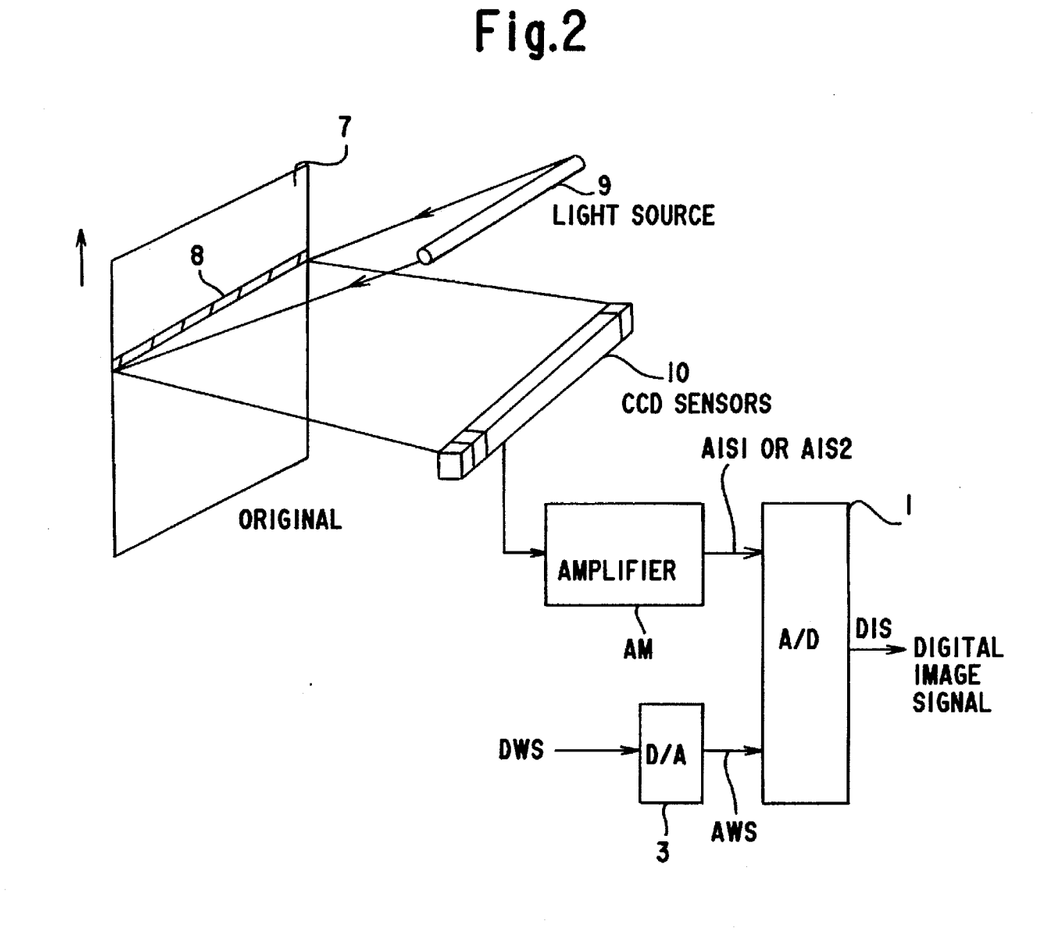
FIG. 2 is a schematic view showing essential parts of a standard image scanner.

FIG. 2 is a schematic view showing essential parts of an image scanner. In the figure, reference numerals 1 and 3 correspond to those of FIG. 1. Numeral 7 is an original, 8 is a scan line, 9 is a light source such as a fluorescent lamp, 10 is an array of CCD sensors for sensing reflected light from pixels in the scan line 8, and AM is an amplifier.

The light source 9 and sensors 10 share a base. The original 7 is fed in the direction of an arrow mark, and the sensors 10 raster-scan images recorded on the original 7. Each of the sensors 10 provides the amplifier AM with a signal representing a corresponding pixel in the scan line. The amplifier AM provides an output AIS 1 or AIS 2, which is supplied to the analog-to-digital converter 1 explained for FIG. 1.

Figure 3:
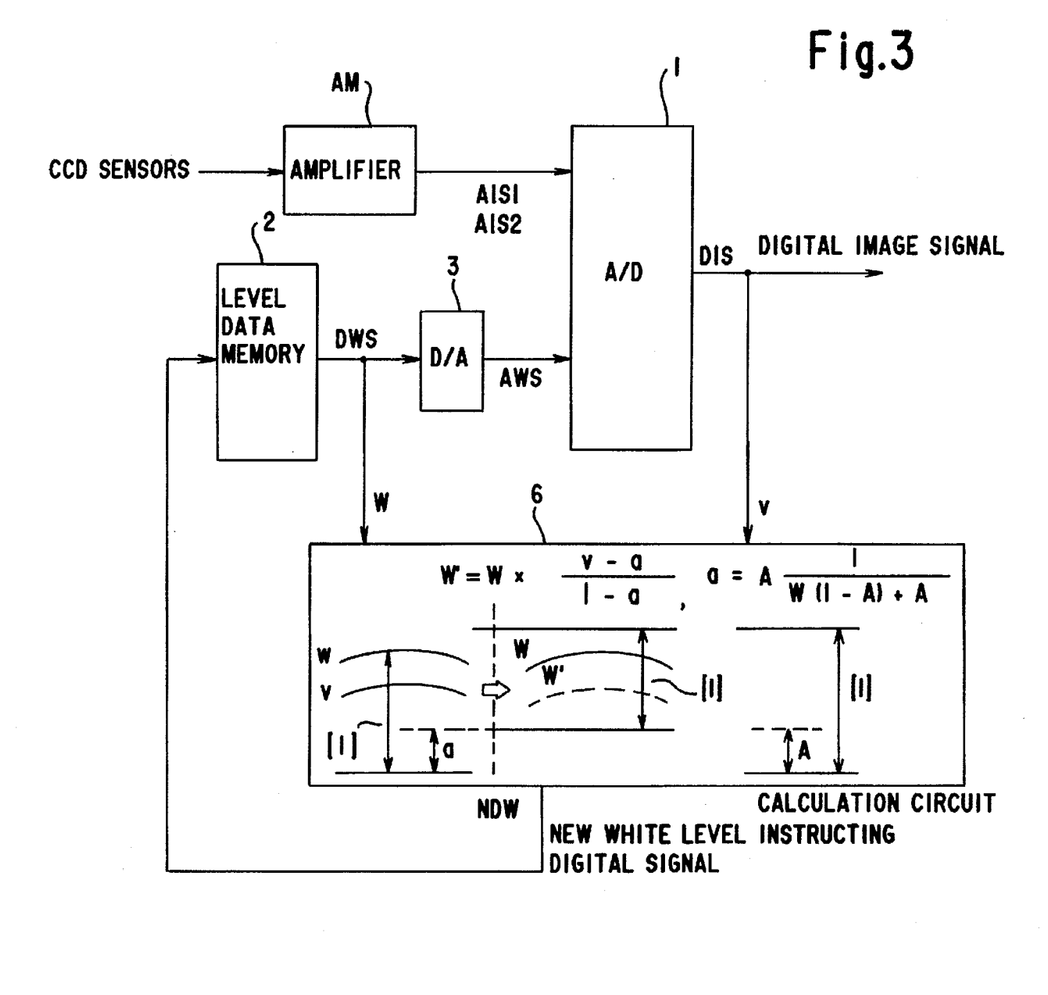
FIG. 3 is a schematic view showing a white level setting system according to an embodiment of the present invention.

FIG. 3 is a schematic view showing a white level setting system according to an embodiment of the present invention. In FIG. 3, the same reference numerals as those shown in FIGS. 1 and 2 represent like parts, and therefore, the detailed explanations of the parts are not repeated. A digital image signal DIS representing a pixel in a scan line on a white reference or on the ground color of an original has a gray level (a white level) of v. At this time, a digital white level signal DWS provided for the pixel has a white level of W (w). There will be a difference between the levels v and W.

Theoretically, the level v of the pixel must be determined according to a required white level W' (w') for the corresponding scan line on the white reference or on the ground color of the original. Accordingly, the calculation circuit 6 according to the present invention carries out the following calculations:

$$W'=W\times(v-a)/(1-a)$$

$$a=A\times 1/[W\times(1-A)+A] \qquad (1)$$

where A is a correction value for correcting a difference in the dynamic ranges of the analog-to-digital converter 1 and digital-to-analog converter 3. The gray level (white level) v of a pixel at a corresponding position in the next scan line is determined according to the white level W' represented with a new digital white level signal.

According to the prior art of FIG. 5, the white level W' is obtained after several scan lines. On the other hand, the present invention provides the white level W' only after one scan line.

Figure 4A:
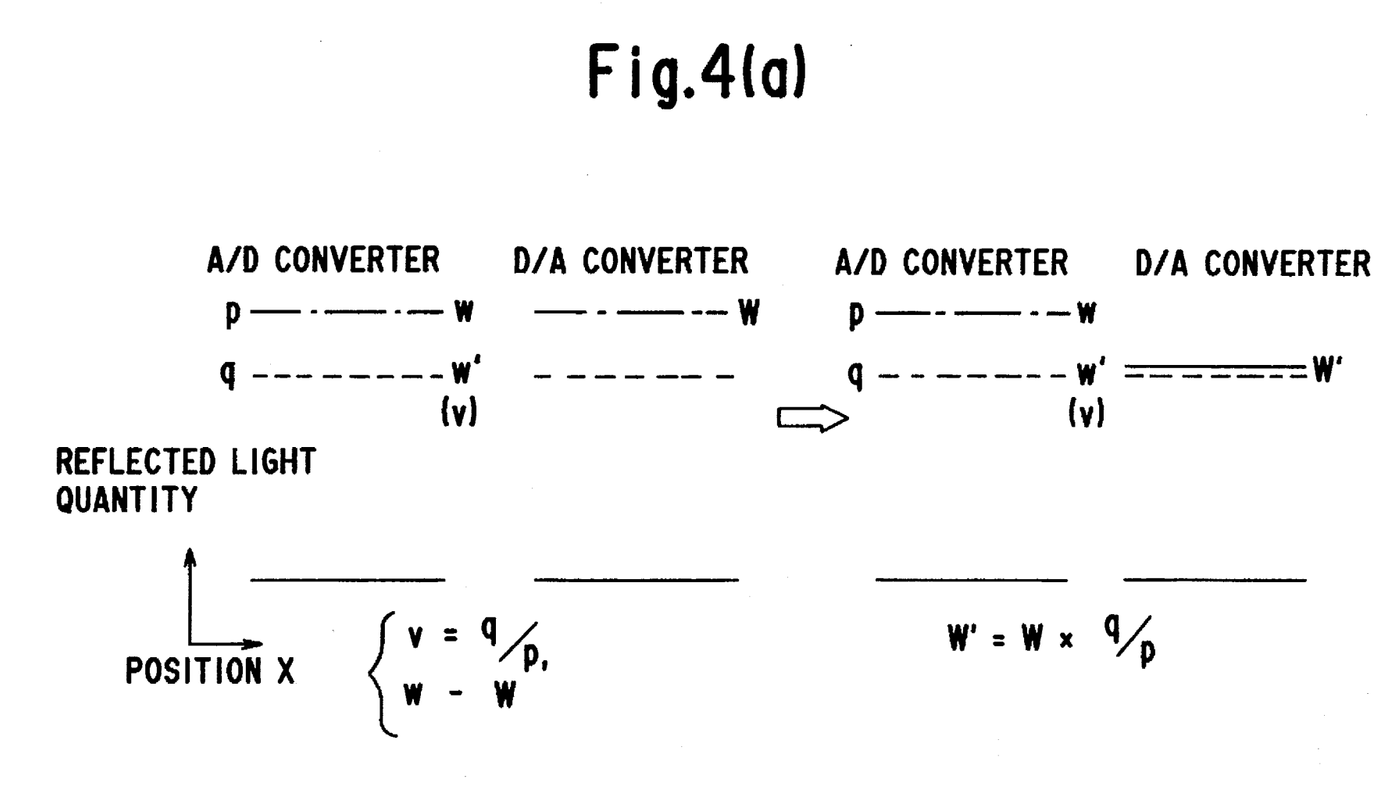
FIGS. 4(a) and 4(b) explain a principle of a calculation circuit shown in FIG. 3.
Figure 4B:
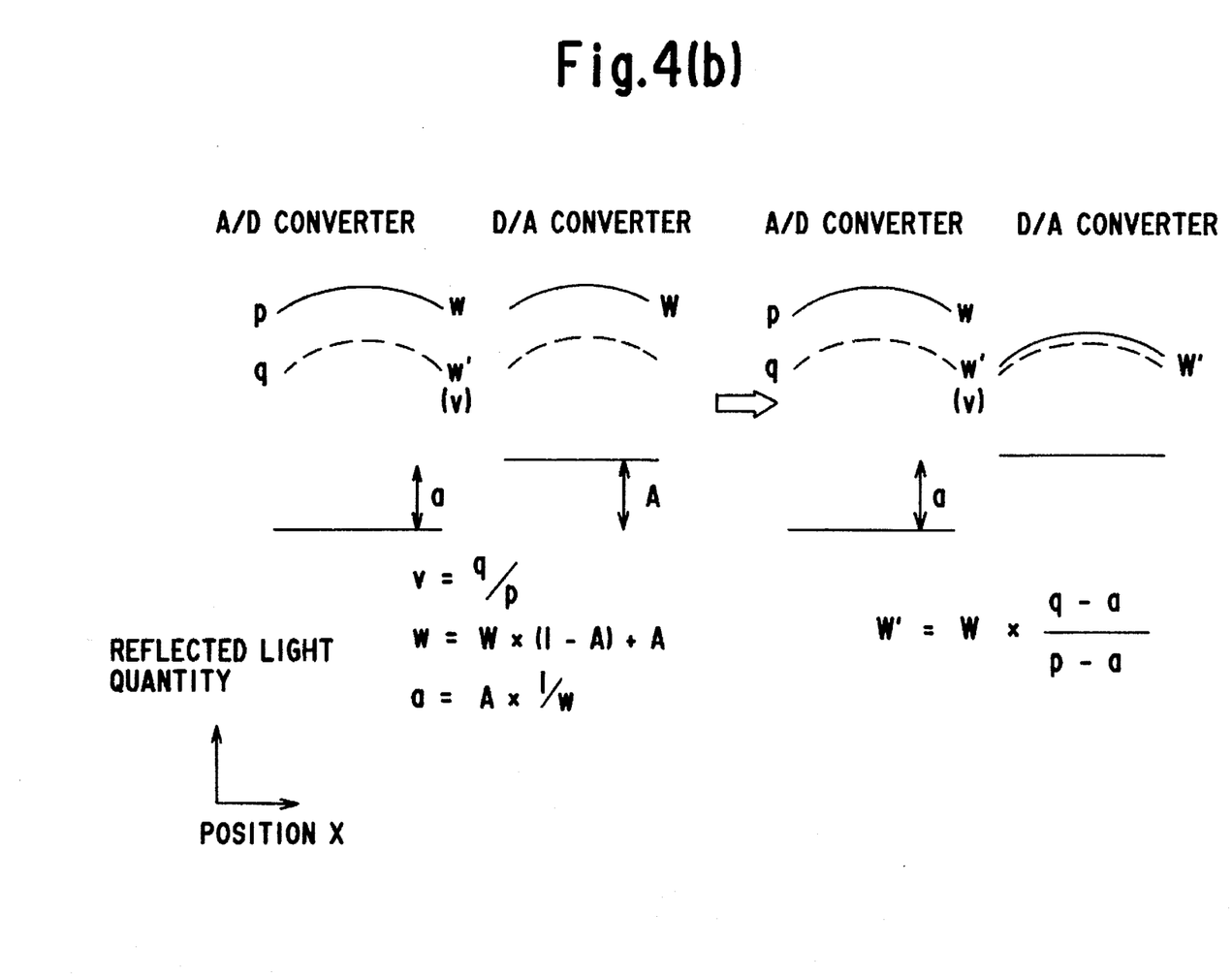

FIGS. 4(a) and 4(b) explain the basis of the expression (1).

In the figure, an abscissa represents pixel positions x in a scan line, and an ordinate represents reflected light quantities.

The left side of FIG. 4(a) shows a white level w (=p) provided by the level data memory 2 for the scan line. At this time, the reflected light quantity from a corresponding pixel after scanning a white reference or the ground color of an original is q. The right side of FIG. 4(a) shows that a white level for the next scan line must be w' (=q).

In FIG. 4(a), the level W shown in FIG. 3 is as follows:

$$W=p=w$$

The level v shown in FIG. 3 is as follows:

$$v=q/p=w'$$

where the level v is based on the fact that the level w represents a pure white level.

Accordingly, the white level W' to be set for the next scan line is as follows:

$$W'=p\times q/p=q=w\times v=W\times v$$

The calculation circuit 6 theoretically carries out the calculations mentioned above, to obtain the new white level W'.

In practice, however, central pixels in the scan line 8 provide larger reflected light quantities because the light source 9 shown in FIG. 2 is linear and because the gray levels of the periphery of the original 7 are lower than those of the ground color of the original. Accordingly, the larger reflected light quantities from the central pixels provide a curve with a swelled central part as shown in the left side of FIG. 4(b). (The swelled part is exaggerated in the figure.)

Generally, the dynamic range of the analog-to-digital converter 1 of FIG. 3 differs from that of the digital-to-analog converter 3 of FIG. 3. Accordingly, it is necessary to employ the correction value A when converting signals shown in the left side of FIG. 4(b) into those shown in the right side of the same figure. The required white level W', therefore, is expressed as follows:

$$W'=W\times(v-a)/(1-a)$$

$$a=A\times 1/\{W\times(1-A)+A\}$$

After these calculations, the calculation circuit 6 provides the level data memory 2 with a new white level instructing digital signal NDW for a corresponding pixel position in a scan line, and accordingly, the level data memory 2 provides a digital white level signal DWS for the pixel position. Since it is known that reflected light quantities at a central part of a scan line curve as shown in FIG. 4(b), the level data memory 2 may store digital white level signals DWS beforehand, to compensate the curve. In this case, the calculation circuit 6 calculates an average white level W' for a given scan line, and according to the calculation, provides a new white level instructing digital signal NDW only once for the given scan line.

As explained above, the white level setting system according to the present invention correctly provides a required white level W' after a single scan line. Namely, this system is capable of guaranteeing the quality of images except for a first scan line.

Next, a binarization system according to an embodiment of the present invention will be explained. Before explaining the embodiment, a binarization system according to a prior art and the problems thereof will be explained with reference to FIG. 11.

Figure 11:
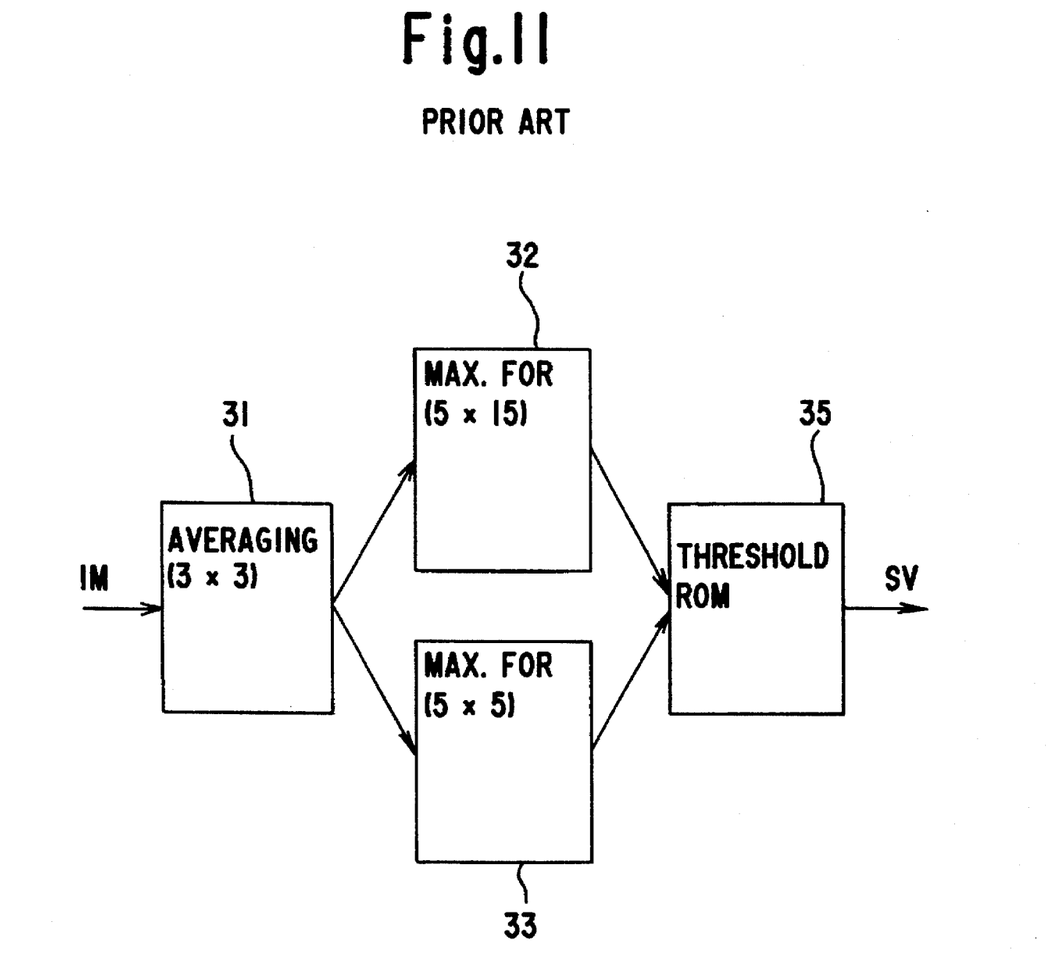
FIG. 11 is a schematic view showing essential parts of a binarization system according to a prior art.

FIG. 11 shows a slice level determining process according to the prior art for an image scanner. In the figure, a reference mark IM is original digital image data, 31 is an averaging unit, 32 is a first maximum detector, 33 is a second maximum detector, 34 is a threshold ROM, and SV is a slice level output.

The original data IM is formed by converting the gray levels of read pixels into digital signals by an analog-to-digital converter.

The averaging unit 31 averages the gray levels of each matrix of 3×3 pixels of the original data. The gray level average is supplied to the first and second maximum detectors 32 and 33.

The first maximum detector 32 detects a maximum among the averaged 5×5 pixels. The second maximum detector detects a maximum among the averaged 5×15 pixels.

The threshold ROM 35 stores a threshold table containing thresholds for maximums to be detected among 5×5 and 5×15 pixels, and the threshold table provides a slice level SV in response to the outputs of the first and second maximum detectors 32 and 33.

The slice level thus obtained is compared with the gray levels of each pixel in the original data. If the gray level of a given pixel is greater than the slice level, the pixel is determined to be a black pixel, and if it is smaller than the slice level, it is determined to be a white pixel.

Since the conventional binarization system obtains a slice level as mentioned above, the system hardly recognizes characters recorded on an original if the original involves a wide range of gray levels. In this case, the system causes deformation at a dark part of the original and blurring at a pale part of the original.

The prior art is vulnerable to noise to easily cause black dots in an area where no characters are recorded. The prior art is ineffective for characters that are out of predetermined size ranges. In addition, the prior art requires a large memory.

An object of the present invention is to provide a binarization system for an image scanner, which correctly reads an original involving a wide range of gray levels without causing unwanted black dots and is capable of reading characters that are out of predetermined size ranges.

Figure 6:
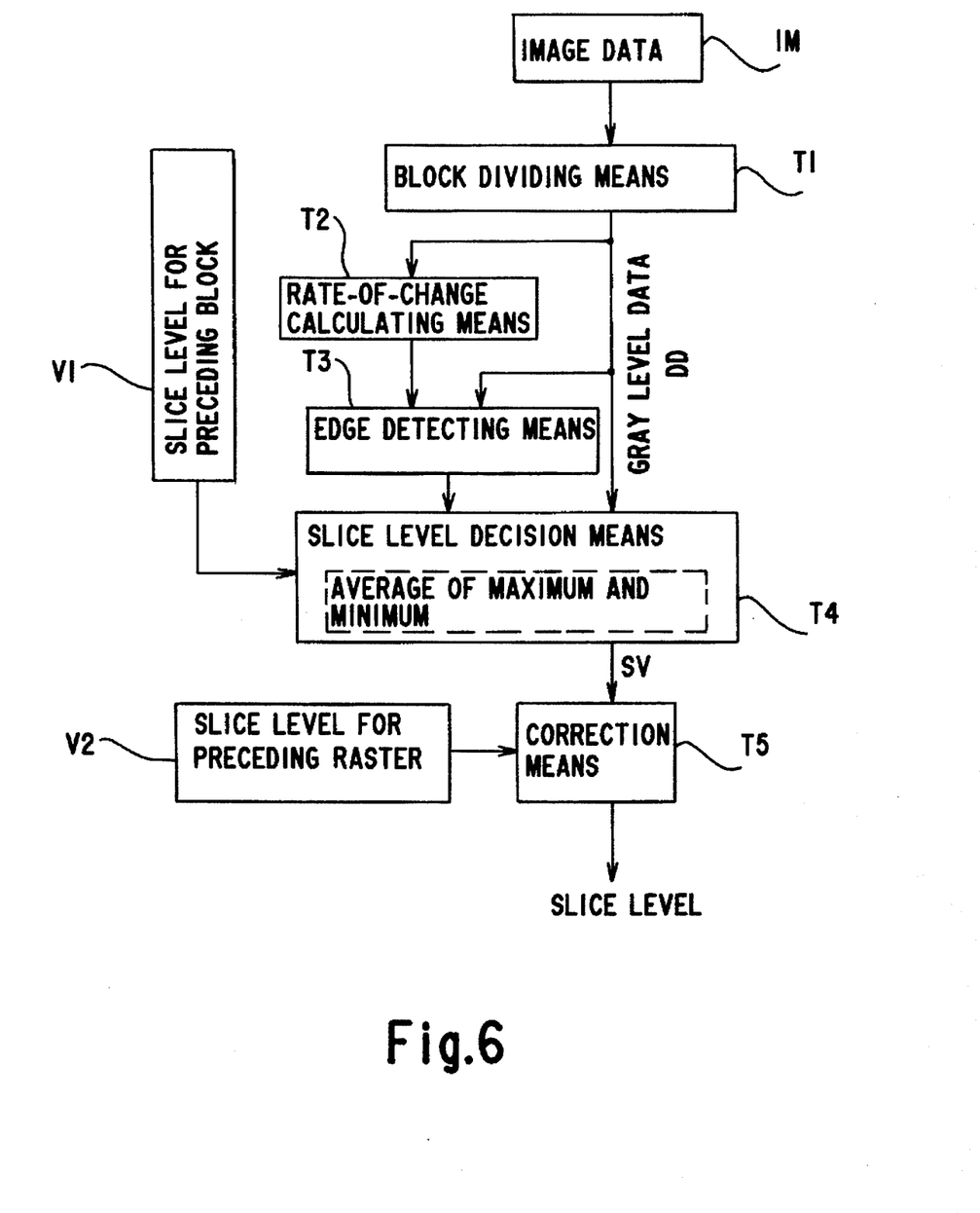
FIG. 6 is a schematic view showing essential parts of a binarization system according to the present invention.

FIG. 6 is a schematic view showing a binarization system according to the present invention. This system compares the gray levels of read image data with a slice level and converts the read image data into binary data. Namely, the system divides the read image data into unit blocks, finds rates of changes in gray levels in each of the blocks, detects edges in the read image data, determines a slice level for each of the blocks, and provide binary data for the image data according to the slice level.

When image data in a given block have a narrow range of gray levels, the binarization system employs a slice level for the preceding block for the given block. The binarization system finds the average of maximum and minimum gray levels of edges, to determine a slice level. The slice level is corrected according to a slice level for a corresponding block in the preceding raster.

In this way, the binarization system according to the present invention divides read image data into unit blocks, detects edges according to rates of changes in gray levels in each of the blocks, and determines a slice level for each of the blocks according to the gray levels of the edges. The binarization system determines an optimum slice level for each of the blocks even if the read image involves a wide or narrow range of gray levels. The size of each block to determine a slice level may be changed according to character sizes, to read characters that are out of predetermined size ranges.

Figure 7:
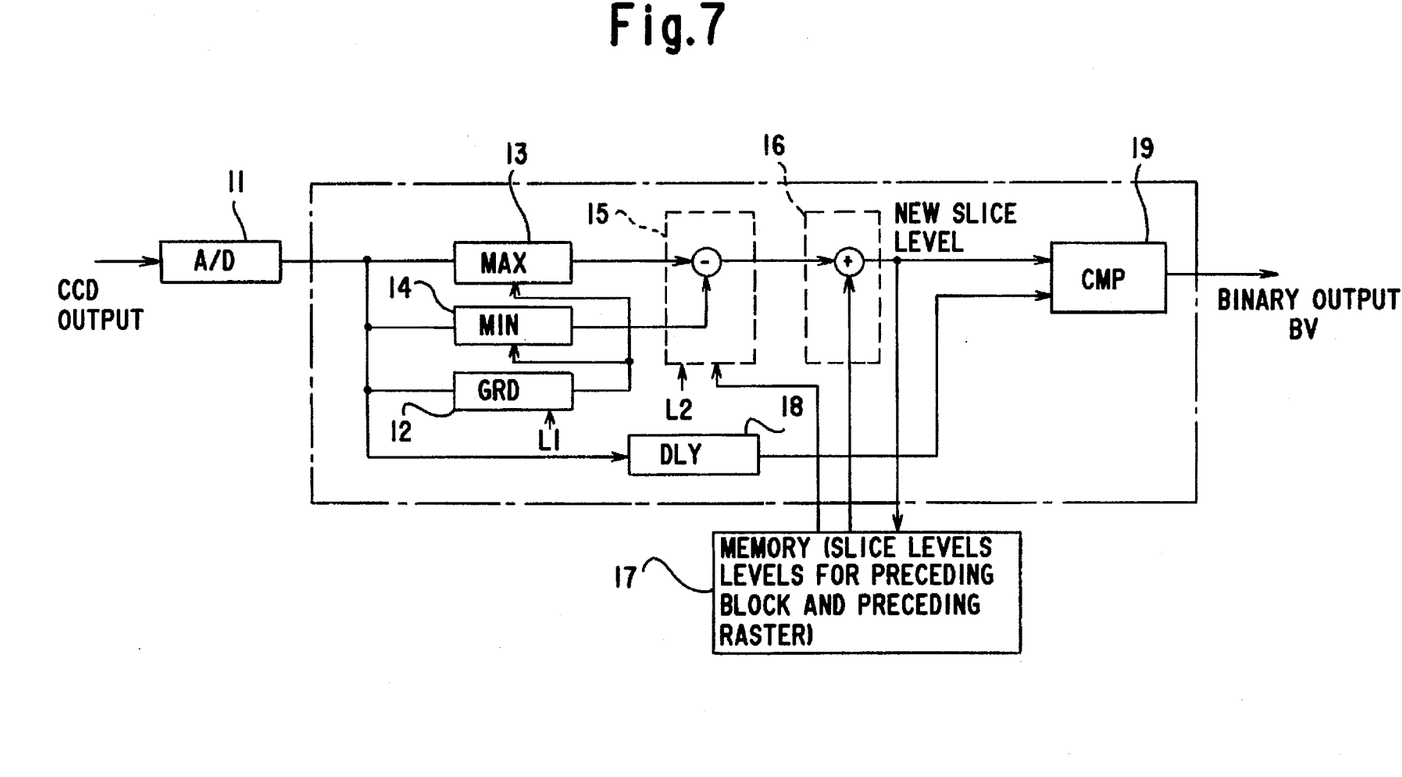
FIG. 7 is a schematic view showing a binarization system according to an embodiment of the present invention.

FIG. 7 is a schematic view showing an embodiment of the present invention. Numeral 11 is an analog-to-digital converter, 12 is a gradient filtering unit GRD, 13 is a maximum decision unit MAX, 14 is a minimum decision unit MIN, 15 is a slice level decision unit, 16 is a weighted mean calculator, 17 is a memory, 18 is a delay circuit DLY, and 19 is a comparator CMP.

The analog-to-digital converter 11 converts the gray levels of pixels read by, for example, CCD sensors into digital signals. These digital signals are supplied to the gradient filtering unit 12, maximum decision unit 13, and minimum decision unit 14.

The gradient filtering unit 12 finds rates of changes in the gray levels of the pixels and provides an output whenever a rate of change exceeds a threshold L1.

The maximum decision unit 13 finds, in each of the blocks, a maximum among the gray levels for which the gradient filtering unit 12 has provided outputs. The minimum decision unit 14 finds, in each of the blocks, a minimum among the gray levels for which the gradient filtering unit 12 has provided outputs.

The slice level decision unit 15 finds the average of the maximum provided by the maximum decision unit 13 and the minimum provided by the minimum decision unit 14 if a difference between the maximum and minimum is greater than a threshold L2, and sets the average as a slice level for a corresponding block. If the difference between the maximum and minimum is smaller than the threshold L2, a slice level for the preceding block is used for the block in question.

The weighted mean calculator 16 calculates the weighted mean of the slice level determined by the slice level decision unit 15 and a slice level for a corresponding block in the preceding raster. The memory 17 stores the slice level provided by the weighted mean calculator 16, for the next raster.

The comparator 19 compares the slice level provided by the weighted mean calculator 16 with the digital gray level of each pixel provided through the delay circuit 18, to determine whether the pixel is black or white.

Figure 8A:
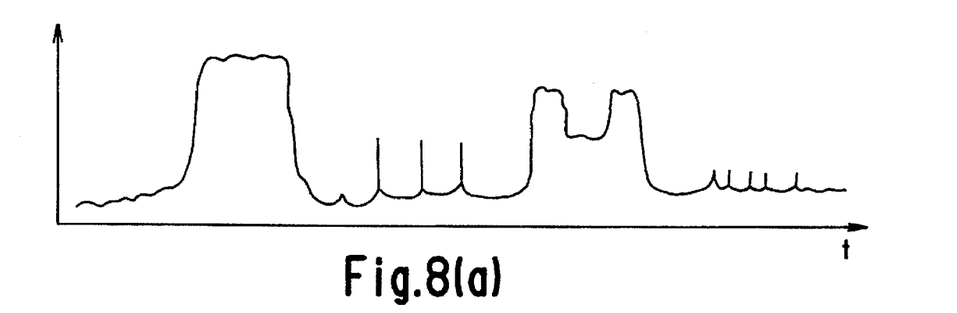
FIGS. 8(a), 8(b), and 8(c) are timing charts showing data in the system of FIG. 7.
Figure 8B:
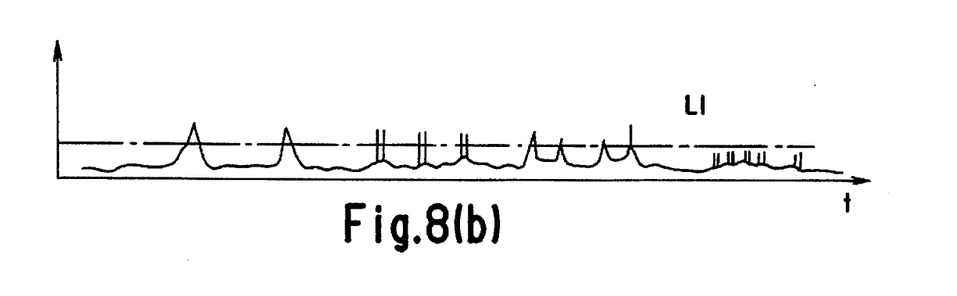
Figure 8C:
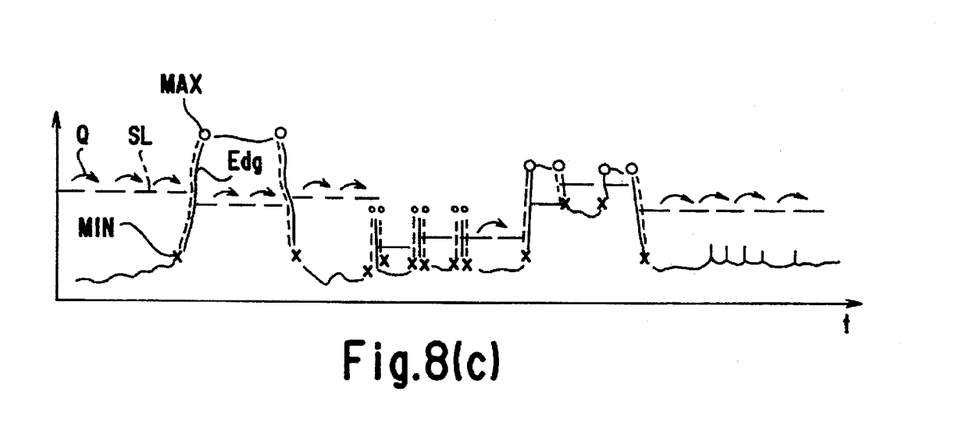

FIGS. 8(a), 8(b), and 8(c) are timing charts showing data according to the embodiment, in which FIG. 8(a) shows read gray levels, FIG. 8(b) shows data processed by the gradient filtering unit, and FIG. 8(c) shows determined slice levels. L1 in FIG. 8(b) is the threshold of the gradient filtering unit 12, SL in FIG. 8(c) is a slice level determined for each block, a dotted line Edg in FIG. 8(c) is an edge found in the gray levels, MAX "o" in FIG. 8(c) is a maximum in each edge, and MIN "x" in FIG. 8(c) is a minimum in each edge. A mark "Q" will be explained later. The details of these will be explained later.

Figure 9:
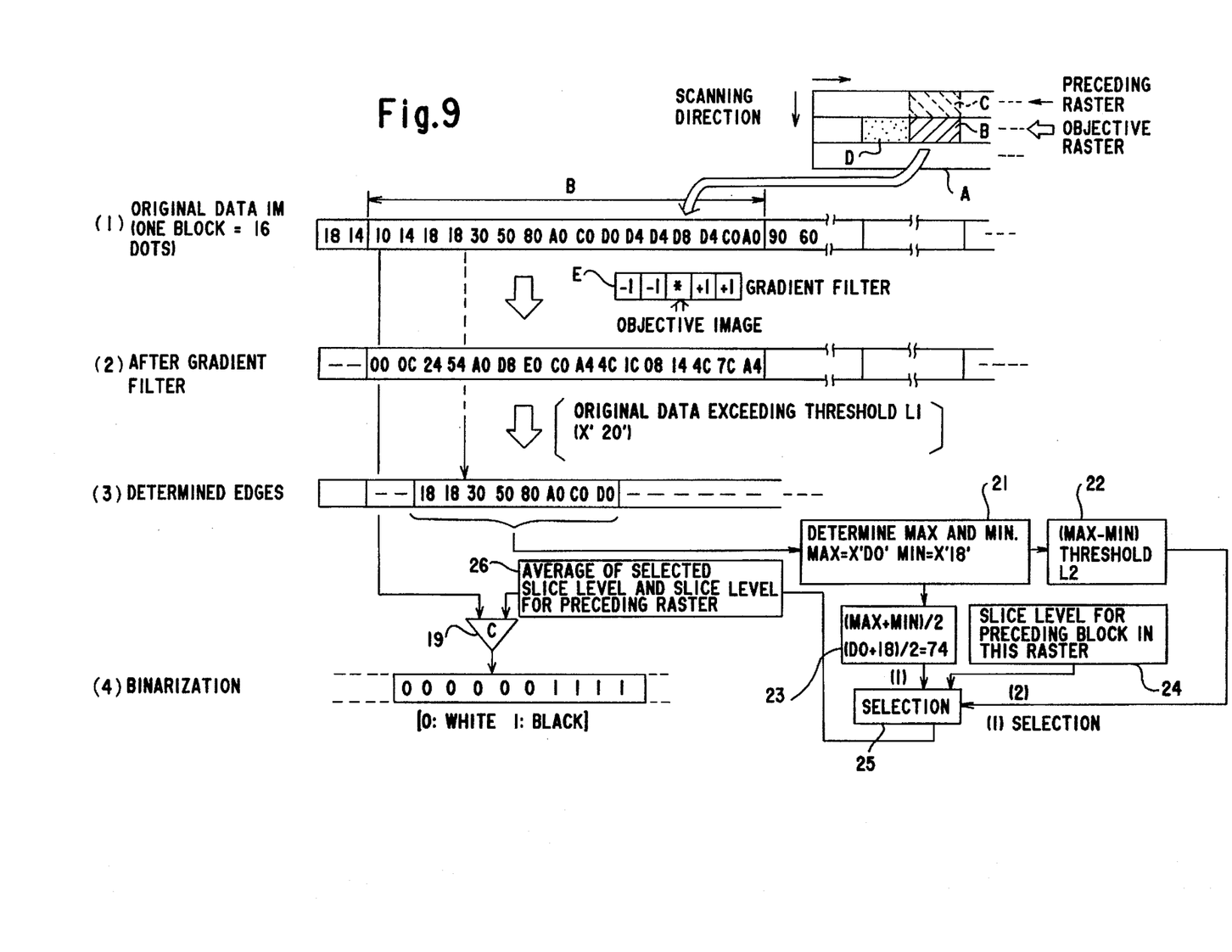
FIG. 9 explains operations of the system of FIG. 7.

FIG. 9 shows operations of the embodiment. In the figure, a reference mark A is an original to be read, B is an objective block to be read in the present raster, C is a block in front of the objective block B, D is a block corresponding to the block B but in the preceding raster, and E is a coefficient used by the gradient filtering unit 12. Operations of these parts will be explained later.

A reference mark (1) is original digital data (each block involving 16 dots) converted from analog signals read on an original, (2) is data processed by the gradient filtering unit, (3) is edge data, and (4) is binary data.

Operations of the embodiment of the present invention will be explained with reference to FIGS. 7, 8, and 9.

CCD sensors scan and read characters, etc., recorded on the original in the right direction in each raster, as indicated with A in FIG. 9. The analog-to-digital converter 11 (FIG. 7) converts the gray levels (FIG. 8(a)) of pixels read by the CCD sensors into digital signals, which are supplied to the gradient filtering unit 12, maximum decision unit 13, and minimum decision unit 14 (FIG. 7).

In FIG. 9, the reference mark (1) is the gray levels (expressed in hexadecimal numerals) read in the block B. The gradient filtering unit 12 (FIG. 7) finds rates of changes in the original digital data IM (1). The rates of changes are each compared with the threshold L1.

Namely, the gray levels of four pixels before and after an objective pixel in the original data (1) are multiplied by coefficients E (−1 and +1), respectively, as shown in FIG. 9. The results are added to one another, and the absolute value of the sum is provided as a rate of change in the gray level of the objective pixel as shown in FIG. 8(b) and (2) in FIG. 9.

It is determined whether or not the rate of change (FIG. 8(b) and (2) in FIG. 9) is greater than the threshold L1. If it is greater, the objective pixel is determined to be related to the edge Edg. According to the original data (1) of FIG. 9 corresponding to the pixel, edge data is obtained as shown in (3) in FIG. 9.

When any piece of data (2) processed by the gradient filtering unit is greater than a threshold of, for example, X'20', corresponding data in the original data (1) is set as edge data. Here, X'20' indicates a hexadecimal numeral of 20. Hereinafter, a hexadecimal numeral is expressed as, for example, X'20'.

The maximum decision unit 13 and minimum decision unit 14 of FIG. 7 determine a maximum MAX and a minimum MIN among the edge data.

In the example of FIG. 9, a process section 21 determines MAX=X'D0' and MIN=X'18' according to the edge data (3).

After the maximum MAX and minimum MIN are determined, the slice level decision unit 15 of FIG. 7 finds a difference between the maximum MAX and minimum MIN.

If the difference is greater than the threshold L2, the average of the maximum MAX and minimum MIN is calculated, and the average is set as a slice level for the objective block. If the difference is smaller than the threshold, a slice level for the preceding block (the block D in FIG. 9) is selected as a slice level for the objective block (refer to the slice level SL in FIG. 8(c)).

In FIG. 8(c), an arrow mark Q indicates that the slice level SL of a block is used for the next block.

In the example of FIG. 9, a process section 22 finds a difference between the maximum MAX and the minimum MIN and determines whether or not the difference is greater than the threshold L2. If the difference is greater than the threshold, a selection section 25 calculates the average (X'74') of the maximum MAX (X'D0') and the minimum MIN (X'18') and sets the average as a slice level.

If the process section 22 determines that the difference between the maximum MAX and minimum MIN is smaller than the threshold L2, the selection section 25 selects a slice level (24) for the preceding block D in the same raster, for the objective block.

The weighted mean calculator 16 of FIG. 7 calculates the weighted mean of the determined slice level and a slice level for the corresponding block C in FIG. 9 in the preceding raster read out of the memory 17, to determine a final slice level. The comparator 19 of FIG. 7 compares the slice level provided by the weighted mean calculator 16 with the original data provided through the delay circuit 18, to determine whether each piece of the original data is black or white.

Figure 10:
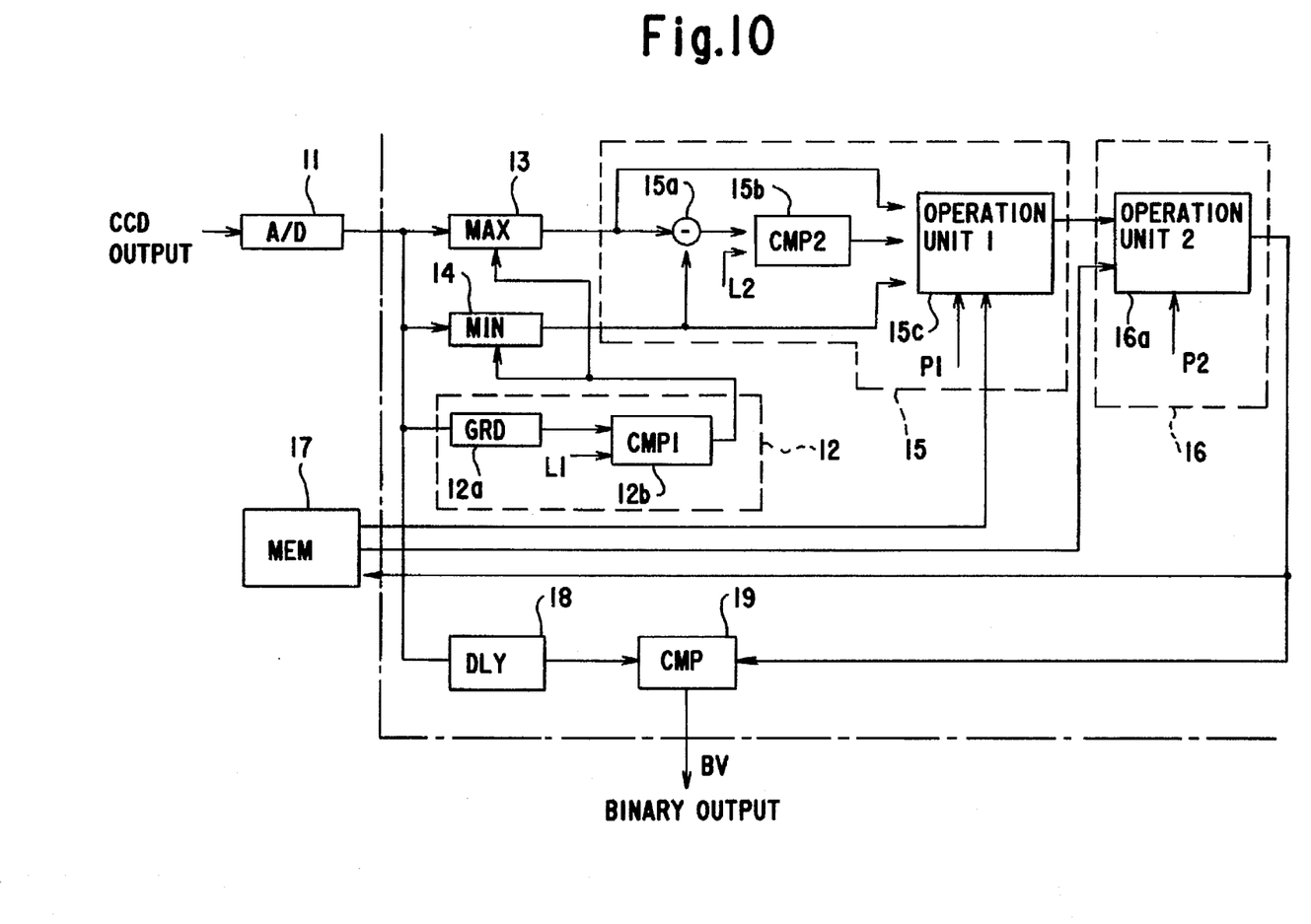
FIG. 10 shows the details of a gradient filtering unit, slice level decision circuit, and weighted mean calculator.

FIG. 10 is a schematic view showing an embodiment of the present invention. In the figure, the same parts as those of FIG. 7 are represented with like reference marks. Numeral 11 is an analog-to-digital converter, 12 is a gradient filtering unit, 12a is a gradient filter, 12b is a first comparator, 13 is a maximum decision unit, 14 is a minimum decision unit, 15 is a slice level decision unit, 15a is a subtracter, 15b is a second comparator, 15c is a first operation unit, 16 is a weighted mean calculator, 16a is a second operation unit, 17 is a memory, 18 is a delay circuit, and 19 is a third comparator.

Similar to FIG. 7, CCD sensors read data, which are converted by the analog-to-digital converter 11 into digital signals. The digital signals are supplied to the gradient filtering unit 12, maximum decision unit 13, and minimum decision unit 14.

The gradient filtering unit 12 includes the gradient filter 12a and first comparator 12b. The gradient filter 12a finds a rate of change in an output of the analog-to-digital converter 11. The first comparator 12b compares an output of the gradient filter 12a with the threshold L1, and a result of the comparison is supplied to the maximum decision unit 13 and minimum decision unit 14.

Among gray levels in a given block provided by the analog-to-digital converter 11, those that have caused the gradient filtering unit 12 to generate outputs are searched by the maximum decision unit 13 and minimum decision unit 14, to find a maximum and a minimum, which are provided to the slice level decision unit 15.

The slice level decision unit 15 includes the subtracter 15a, second comparator 15b, and first operation unit 15c. The subtracter 15a calculates a difference between the outputs of the maximum decision unit 13 and the minimum decision unit 14. The comparator 15b compares the difference with the threshold L2 and provides a result of the comparison to the first operation unit 15c.

When the difference is smaller than the threshold L2, the first operation unit 15c provides a slice level for the preceding block in the same raster read out of the memory 17 as a slice level output, and when the difference is greater than the threshold L2, provides the average of the outputs of the maximum decision unit 13 and minimum decision unit 14 as the slice level output. When calculating the average of the outputs of the maximum and minimum decision units 13 and 14, the first operation unit 15c calculates a weighted mean thereof with a parameter P1.

The weighted mean calculator 16 has the second operation unit 16a. The second operation unit 16a calculates the weighted mean of the slice level provided by the first operation unit 15c and a slice level for a corresponding block in the preceding raster read out of the memory 17 and provides the third comparator 19 with the weighted mean as a slice level for the objective block. When calculating the weighted mean, the second operation unit 16a employs a parameter P2. Similar to the example of FIG. 7, the comparator 19 compares the slice level provided by the weighted mean calculator 16 with the original data provided through the delay circuit 18, to determine whether the data is white or black.

Although the above embodiment employs the linear gradient filter for detecting edges, this does not limit the binarization system according to the present invention. Other filters such as two-dimensional gradient filters, one- or two-dimensional Laplacian filters, or two-dimensional Sobel filters are employable to obtain rates of changes in gray levels.

When a difference between a maximum and a minimum at an edge is small, a slice level for the preceding block in the same raster is used for an objective block. This does not limit the present invention. For example, a slice level for another block is employable when the difference is small.

The above embodiment determines a slice level according to the average of a maximum and a minimum among gray levels related to a detected edge. This does not limit the present invention. The slice level may be determined according to the average of all the gray levels related to the detected edge. In any case, a slice level is determined according to gray levels related to a detected edge.

The above embodiment employs a weighted mean calculator for calculating a weighted mean with use of a slice level for a corresponding block in the preceding raster and determines a final slice level. The weighted mean calculator is not always required. In practice, it will cause no problem if a slice level is obtained without the weighted mean calculator.

As explained above, a binarization system according to the present invention divides read gray levels into blocks, finds edges in the gray levels according to rates of changes in the gray levels, and determines a slice level according to the gray levels related to the edges. The binarization system correctly reads an original involving a wide range of gray levels without causing unwanted black dots. This system is capable of reading characters that are out of predetermined sizes. The weighted mean calculator for calculating a weighted mean with use of a slice level for a corresponding block in the preceding raster provides an optimum slice level.

We claim:

1. A white level setting system for an image scanner for scanning an original document and reading characters and images recorded thereon, said system comprising:

an analog-to-digital converter for receiving a first analog image signal obtained by scanning a predetermined white reference and a second analog image signal obtained by scanning the original document, said analog-to-digital converter also for receiving an analog white level representing a required white level, said analog-to-digital converter providing a digital image signal representing a gray level corresponding to the first and second analog image signals according to the analog white level signal serving as a white level of 1;

a level data memory for providing a digital white level signal representing the required white level in response to a new digital white level signal input thereto;

a digital-to-analog converter for converting the digital white level signal representing the required white level from the level data memory into the analog white level signal representing the required white level, said analog white level signal being input to said analog-to-digital converter; and a calculation circuit coupled to the analog-to-digital converter and the level data memory for receiving the digital image signal representing the first analog image signal and the second analog image signal from the analog-to-digital converter, and for receiving the digital white level signal from the level data memory, said calculation circuit providing the new digital white level signal to the level data memory, wherein the digital white level signal from the level data memory corresponds to the digital image signal when there is a difference between the white levels represented thereby, thereby setting a white level in response to a change in the gray level of a ground color of the original, and wherein, when the white level represented with the digital image signal is "v" and the white level represented with the digital white level signal is "W", the calculation circuit carries out the following calculation to enable the level data memory to provide the digital white level signal representing a new white level W':

$$W' = W \times (v-a)/(1-a)$$

$$a = A \times 1/(W \times (1-A) + A)$$

where A is a correction value, and according to a result of the calculation, the calculation circuit provides a new digital white level signal, wherein the new digital white level signal is provided to the level data memory.

* * * * *